UNITED STATES PATENT OFFICE.

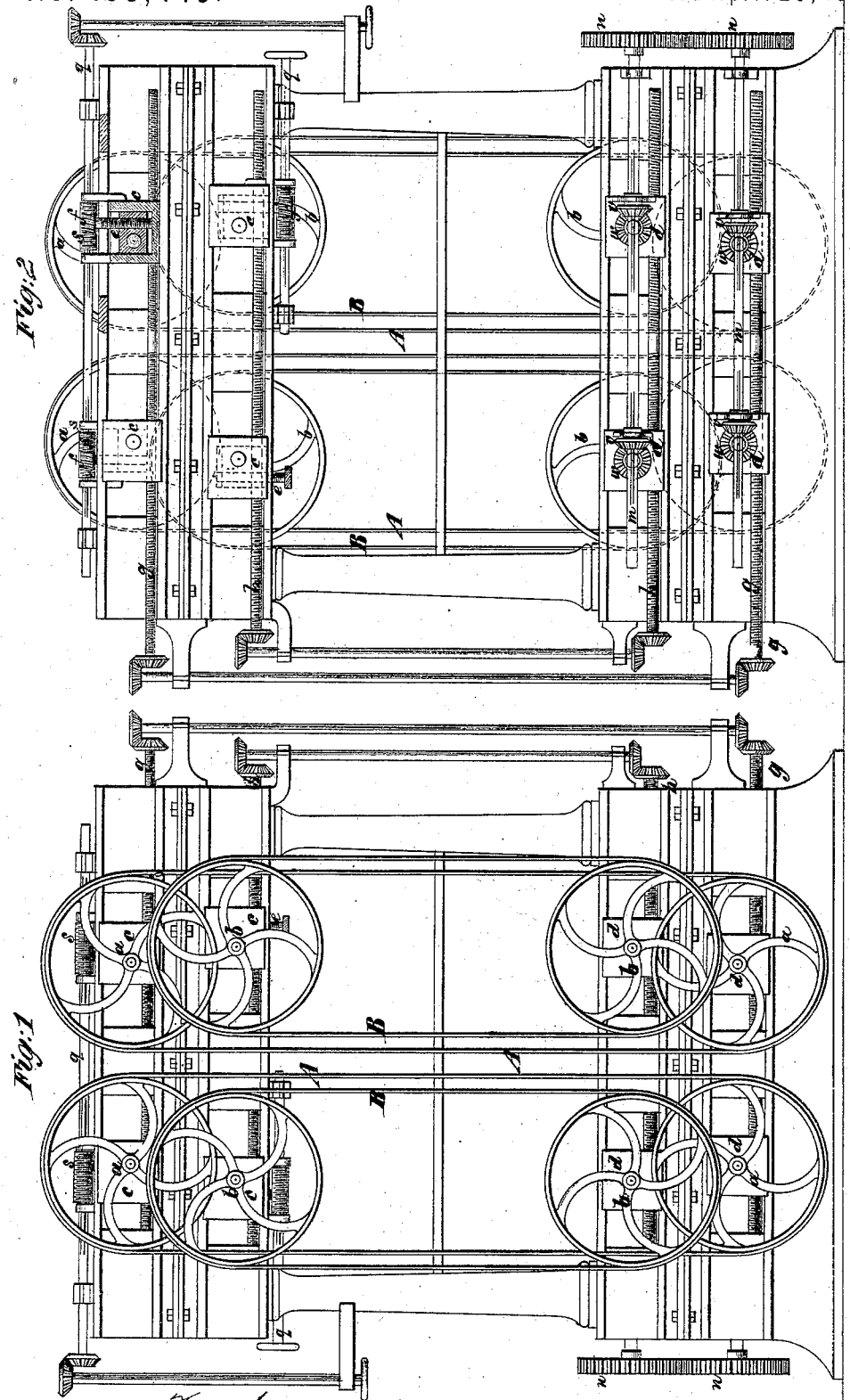

HENRY SILLMAN, OF BROOKLYN, NEW YORK.

IMPROVEMENT IN BAND SAWING-MACHINES.

Specification forming part of Letters Patent No. 138,443, dated April 29, 1873; application filed June 14, 1872.

*To all whom it may concern:*

Be it known that I, HENRY SILLMAN, of Brooklyn, in the county of Kings and State of New York, have invented Improvements in Band-Saw Gangs, of which the following is a specification:

This invention relates to means of adjusting the several saws of a gang of band-saws, whereby great convenience is afforded for the several adjustments required.

In the accompanying drawing, Figure 1 is a front view of a band-saw gang having my improvements applied, and Fig. 2 is a back view of the same.

Similar letters of reference indicate corresponding parts in both figures.

A A and B B are sets or series of band-saws, those A A being one set of pairs or opposites, and B B another pair. These saws are strained over wheels or pulleys $a\ a$ and $b\ b$, whose axles or shafts are supported in journal-boxes $c\ c$ and $d\ d$, capable of sliding laterally in ways provided therefor in the frame of the machine. These boxes are so situated that the saws B B project out beyond the others, A A. These journal-boxes are adjusted laterally by means of screw-threaded shafts $g\ g$ and $h\ h$, each of which is threaded from the middle to one end with a right-hand thread and to the other end with a left-hand thread. At one end these shafts are provided with bevel-wheels, and those of each of the pairs or sets of saws are connected by upright shafts, furnished at their ends with bevel-wheels gearing with those on the screw-shafts, so that by turning the said upright shafts the saws are uniformly adjusted laterally either toward or from each other. The upper journal-boxes $c\ c$ are composed of two parts, one of which slides vertically within the other and carries the shaft of the upper saw-pulley shafts. Screws $e$, screwing through the inner parts and impinging against the bottom of the outer parts, serve to raise the former, and so produce a tension on the saw. This screw may be provided with a head for operation by hand, as shown in the right-hand saw in Fig. 1, and left in Fig. 2, or it may be furnished with a worm-wheel, $f$, to gear with a worm or screw, $s$, on a shaft, $q$, as shown in the other boxes. These worms are secured to shafts $q\ q$, so as to turn therewith, by feathers, but are capable of sliding longitudinally thereon when the journal-boxes are adjusted laterally. They are held so as to move with their boxes by bearings thereon in contact with their ends. A shaft, $l$, arranged at the side of the machine, is geared with the upper shaft $q$ and is manipulated to adjust the tension of the two saws A A together. The lower shaft $q$ is operated by means of a hand-wheel provided on its end. On the rear end of the shafts of the lower pulleys $a\ a$ and $b\ b$ there are gear-wheels $w\ w$, which gear with bevel-wheels $v\ v$ secured, by feathers, to shafts $m\ m$, and capable of sliding thereon. These two shafts are geared together at one end by wheels $n\ n$, and power applied to one is communicated uniformly to the other, so that all the saws are driven together.

The tension of the saws is first adjusted by effecting the turning of the screws $e\ e$ to raise the inner part of the upper journal-boxes, and the saws are then adjusted laterally to the required position; power is now communicated to them, and they then work in the manner usual to band-saws.

Claims.

1. The combination of the upper saw-shaft journal-boxes $c\ c$, made of two parts, one adjustable relatively to the other, as described, the adjusting-screws $e\ e$, worm-wheels $f$, shaft $q$, and endless screws $s\ s$, the whole arranged and operating substantially as described, for the purpose set forth.

2. The combination, with the saws, of bevel-wheels provided on the rear end of the lower pulley-shafts, and corresponding bevel-wheels capable of sliding on shafts geared together, one of which constitutes the driving-shaft, essentially as and for the purpose described.

HENRY SILLMAN.

Witnesses:
FRED. HAYNES,
FERD. TUSCH.